Jan. 5, 1943. J. B. WOODBURY 2,307,717
MATERIAL COLLECTING AND LOADING APPARATUS
Filed Sept. 22, 1941 2 Sheets-Sheet 2
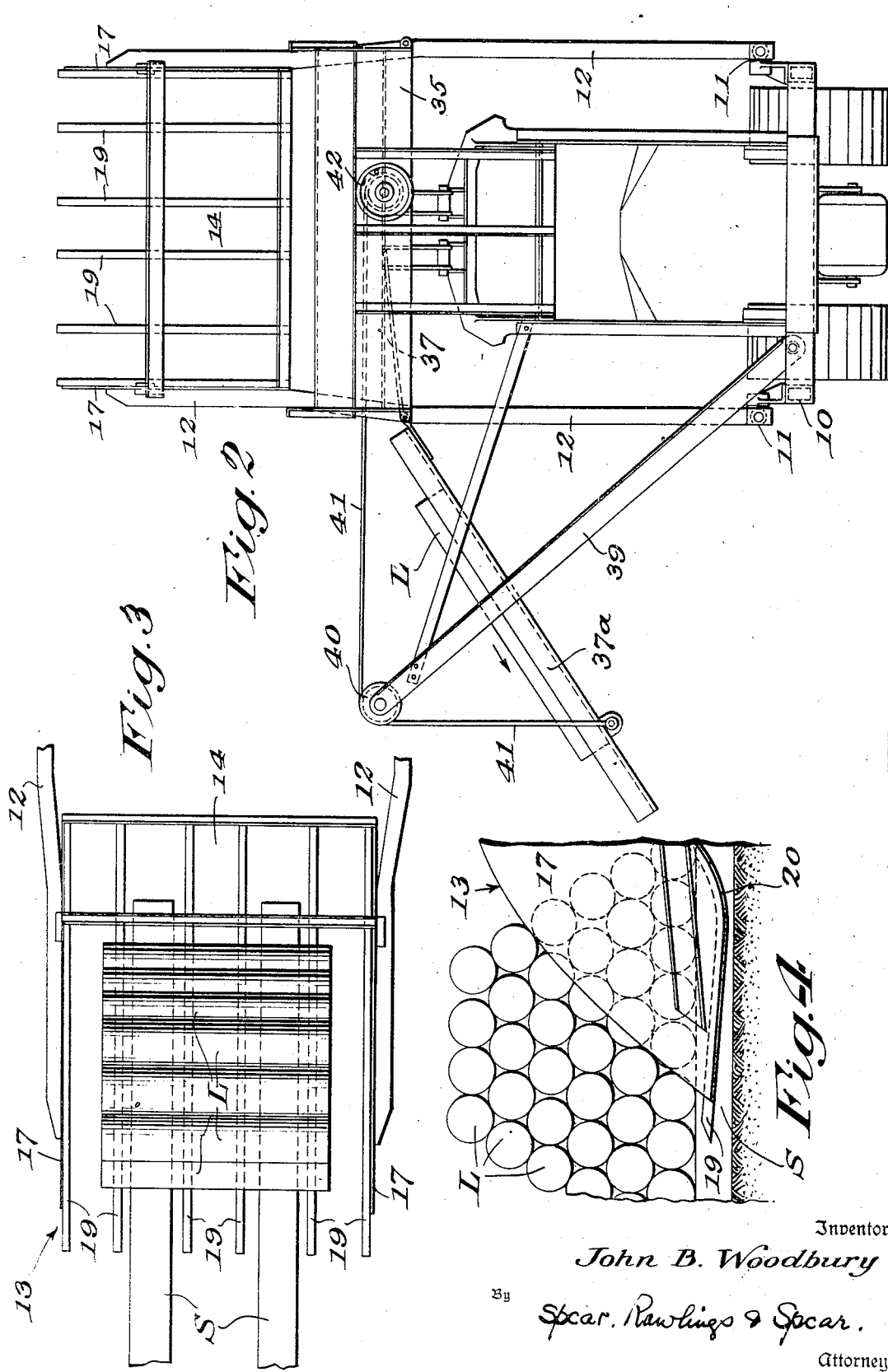
Inventor
John B. Woodbury
By Spear, Rawlings & Spear.
Attorneys.

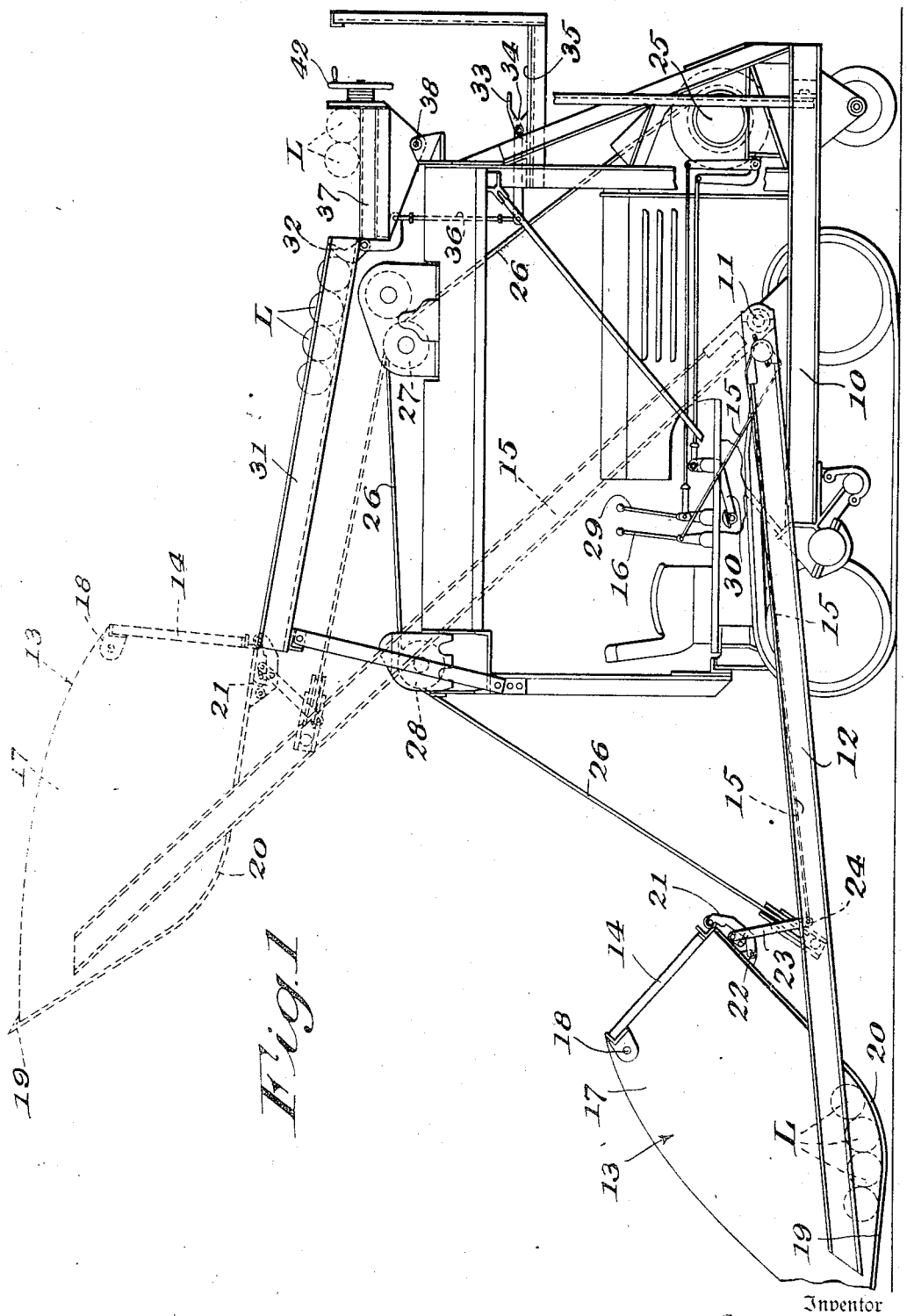

Patented Jan. 5, 1943

2,307,717

UNITED STATES PATENT OFFICE 2,307,717

MATERIAL COLLECTING AND LOADING APPARATUS

John B. Woodbury, South Portland, Maine, assignor to Maine Steel, Inc., South Portland, Maine, a corporation of Maine Application September 22, 1941, Serial No. 411,832

2 Claims. (Cl. 214—131)

This invention relates to machines for handling such objects as pulp wood logs, billets, or other units which have to be moved from the place at which they are collected to the place where they are to be stored or used.

Considering pulp wood logs as typical of the general problem, the logs are piled in the vicinity of the place where they are cut for transportation on sleds or the like to the place where they are to be stored.

The general object of my invention is to provide a machine for efficiently loading the cut logs onto the sleds or other conveyance.

In achieving this object, I utilize the general principle of the machine shown in the Andersen patents, Nos. 2,182,781 and 2,233,237. I have, however, re-designed said machine to adapt it to this special work. As now constructed, the loading receptacle swings through only a limited path, viz., from a loading position near the ground at one end of the tractor to an overhead discharge position at or near vertical center, and the tractor roof is utilized as a support for a forwardly and downwardly inclined chute box into which the logs are discharged from the receptacle.

The bottom wall of the receptacle is of open fork-like construction presenting parallel longitudinally extending tines or teeth. These are so spaced as to straddle the usual skids on which the logs are cross-piled so that when the receptacle teeth are entered beneath one end of the log pile, the logs will be scooped or gathered into the receptacle and will lie cross-wise thereof.

When the receptacle is filled, it is raised to dumping position and the tractor is then moved to a point near the sled or other conveyance onto which the logs are to be dumped, whereupon the cover of the receptacle is tripped by the operator to dump the logs into the chute box.

The logs maintain their cross-wise disposition in the chute box throughout their downward sliding or rolling travel along the same and when they reach the forward end of the chute box they contact a displaceable gate disposed transversely across the lower end of said box. The gate is manually opened and closed in any suitable manner, as by means of a foot-treadle operated by an attendant working from an elevated platform adjacent to the forward end of the chute box, so that the logs may pass said gate singly and discharge by gravity endwise down a second chute disposed at an angle to said chute box and leading to the sled or other conveyance. The last-named chute is preferably angularly adjustable relative to the chute box and may be attached to and operated from either side of the attendant's platform.

By this construction, a load of logs from a log pile may be picked up by the receptacle, the tractor driven to the logging road or other point where the logs are to be unloaded, the receptacle then emptied into the chute box, and the logs controllably discharged from said chute box onto the sled or other conveyance.

Other advantages will appear as the description proceeds.

In the accompanying drawings I have illustrated a machine designed especially to handle logs. Referring to the drawings:

Fig. 1 is a side elevation of my machine showing in full lines the loading position of the receptacle and in dotted lines its discharging position, the rigging for adjusting the discharge chute being omitted for clarity of illustration.

Fig. 2 is an end view of my machine, as seen from the front, the loading receptacle being raised to discharge position.

Fig. 3 is a top plan view showing the loading receptacle in loading position at a log pile, and Fig. 4 is a fragmentary side view thereof.

I have indicated generally at 10 the frame of a tractor or other self-propelled vehicle of conventional type. Pivoted at 11 to the sides of the tractor is a pair of receptacle supporting arms 12 carrying at their outer end a loading receptacle 13 having an automatically latching cover 14 operated by a trip cable 15 from a trip lever 16 preferably mounted within convenient reach of the vehicle driver. The receptacle 13 is of special design. It has an open top and mouth, spaced side walls 17, and a rear wall constituted by the cover 14 which is hinged near its upper edge at 18 to the side walls. The bottom wall of the receptacle is of open fork-like construction presenting a plurality of spaced parallel longitudinally extending tines or teeth 19. These are so spaced as to straddle the usual skids S (see Fig. 4) on which the logs L are piled cross-wise. The tines or teeth are slightly curved as at 20 to fulcrum properly against the ground when entered from one end beneath the log pile and thence extend upwardly and rearwardly in a substantially straight line to the lower or latching edge of the cover 14. The cover latch 21 is pivoted at 22 in any suitable bracket carried by one of the tines or teeth, and the trip arm for said trip is indicated at 23. The trip cable 15 is made fast to the free end of said arm as at 24.

The receptacle is swung in a limited arcuate path over the roof of the tractor by any suitable power means preferably taking its drive from the tractor motor. Such power means may be either mechanical or hydraulic. As shown it is mechanical, and comprises a winch 25 mounted on the tractor. Hoisting cables 26, operating over suitable guide pulleys 27 and 28 connect the drum of the winch to the receptacle arms 12.

The application of power to the winch to raise or lower the receptacle is controlled by an appropriate clutch mechanism, the shift lever for which is indicated at 29, and the receptacle is braked in its travel by an appropriate brake mechanism, the pedal for which is indicated at 30.

Mounted on the roof of the tractor in the fore and aft line thereof is a chute box 31. The box slopes downwardly from rear to front and at its front end wall has a displaceable gate 32 sliding in a vertical path and operated at will by means of a foot treadle or other control 33. The treadle is pivoted at 34 to an elevated platform 35 and is connected by suitable linkage 36 with the gate. The platform 35 is arranged adjacent the discharge end of the chute box 12 so that an attendant stationed on said platform may observe the logs L in the chute box and operate the gate at the proper time.

The chute box is of a width to receive the logs cross-wise as they are dumped in it in that arrangement from the loading receptacle and keeps them in that arrangement as they gravitate down the same.

Preferably the degree of opening movement of the gate is such as to cause the logs to discharge singly therepast.

As the logs leave the gate, they roll onto a downwardly and outwardly inclined discharge apron 37 disposed transversely across the lower end of the chute box. Pivoted to apron 37 at one side or the other of the platform 35 is a chute extension 37ª. The logs lodge endwise therein as they pass the gate 32 (see Fig. 1) and gravitate down the chute in that arrangement to a sled or other conveyance on the ground.

Any suitable mechanism, mechanical or hydraulic, may be provided for adjusting the chute 37ª angularly with respect to the side of the tractor. As shown, the mechanism is mechanical, including an upwardly and outwardly inclined boom 39 mounted on the tractor (see Fig. 2) and carrying at its upper end a sheave 40 over which a cable 41 is trained. Cable 41 is fast at one end to chute 37ª and at its other end to a hand wheel 42 mounted conveniently within the reach of the operator standing on platform 35.

Various modifications in construction and arrangement may obviously be made within the spirit and scope of my invention as defined by the appended claims.

What I therefore claim and desire to secure by Letters Patent is:

1. A log loader, comprising a self-propelled vehicle to be moved to a position at right angles to one end of a pile of logs piled cross-wise on spaced longitudinally extending skids, arms pivoted to the sides of said vehicle and extending beyond the rear end thereof, a receptacle mounted at the free ends of said arms and having spaced side walls, a trip cover pivoted at one edge to said side walls and constituting a displaceable rear wall for said receptacle and an open fork-like bottom between said side walls and presenting spaced parallel longitudinally extending tines or teeth spaced apart a distance to straddle the skids of the log pile when the receptacle is presented at right angles to one end of the log pile for loading whereby when the receptacle is raised the logs will slide rearwardly along said teeth back towards said cover and will be loaded cross-wise into the receptacle, power means for swinging the receptacle in an overhead arcuate path from its loading position to a dumping position adjacent the vertical center of its swing, manually operable means for tripping the receptacle cover, a chute box mounted on the vehicle roof in the fore and aft line thereof and inclined from the rear towards the front end of the vehicle and into which the receptacle discharges, said chute box being so dimensioned as to position the logs crosswise thereof, a manually operable gate at the discharge end of said chute box, and a discharge chute adjacent said gate and disposed at an angle to said chute box for directing the logs discharging thereinto downwardly and laterally away from the vehicle.

2. The log loader of claim 1, and a platform for an attendant adjacent the discharge end of the chute box, the discharge chute being adjustable relative to the vehicle, and there being a control for the gate of the chute box and a control for adjusting said discharge chute, and both of said controls being located conveniently within the reach of an attendant standing on said platform.

JOHN B. WOODBURY.